Dec. 5, 1933.                F. STRICKLAND                1,938,262
                  HIGH TENSION MAGNETO ELECTRIC MACHINE
                    Filed Dec. 29, 1932      3 Sheets-Sheet 1
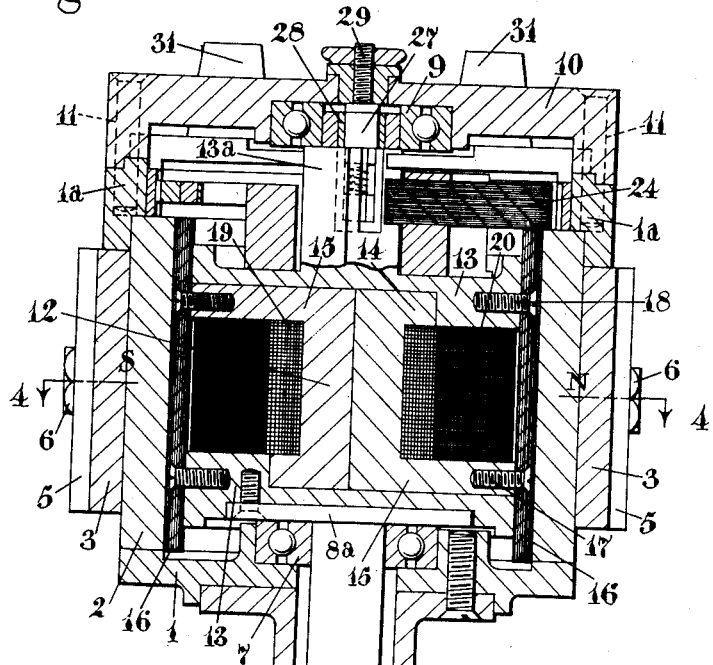
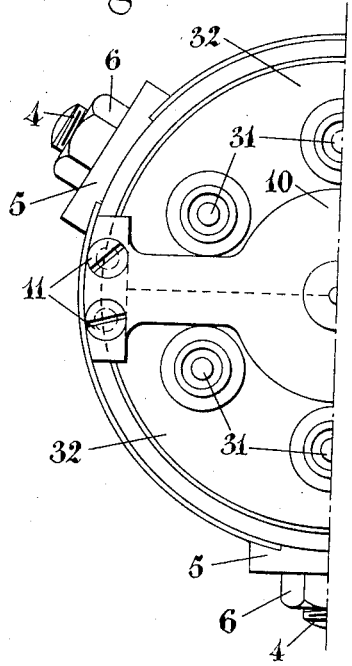
Inventor
Frederic Strickland
By Alexander & Dowell attys.

Dec. 5, 1933.  F. STRICKLAND  1,938,262
HIGH TENSION MAGNETO ELECTRIC MACHINE
Filed Dec. 29, 1932  3 Sheets-Sheet 2

Inventor
Frederic Strickland
By Alexander Dowd
Atty

Dec. 5, 1933.                F. STRICKLAND                1,938,262
                    HIGH TENSION MAGNETO ELECTRIC MACHINE
                         Filed Dec. 29, 1932        3 Sheets-Sheet 3
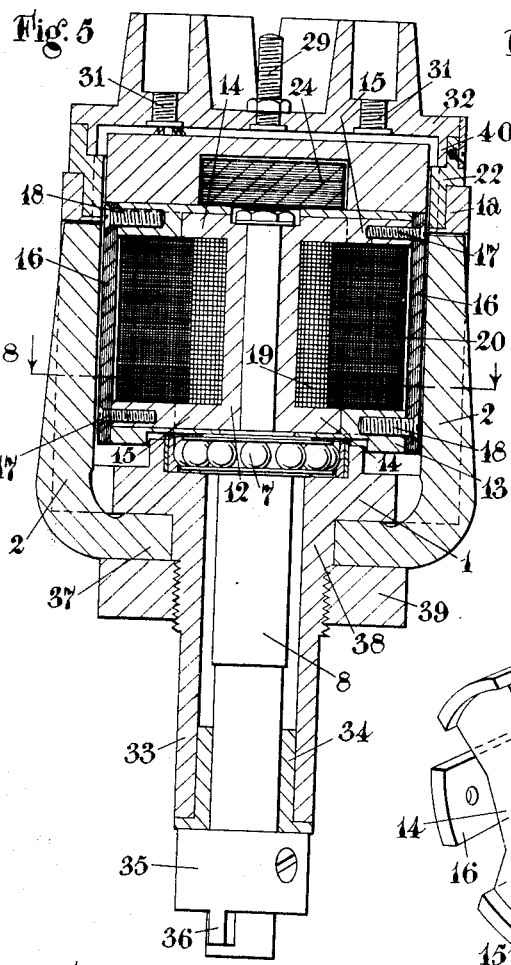
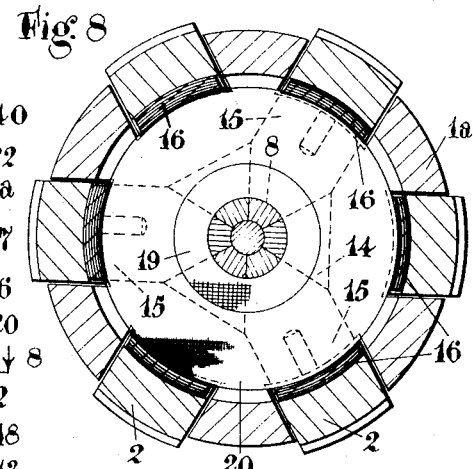
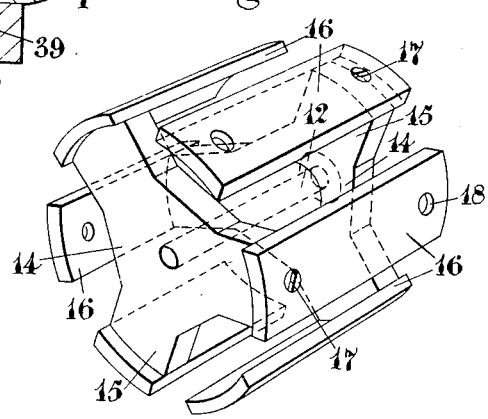
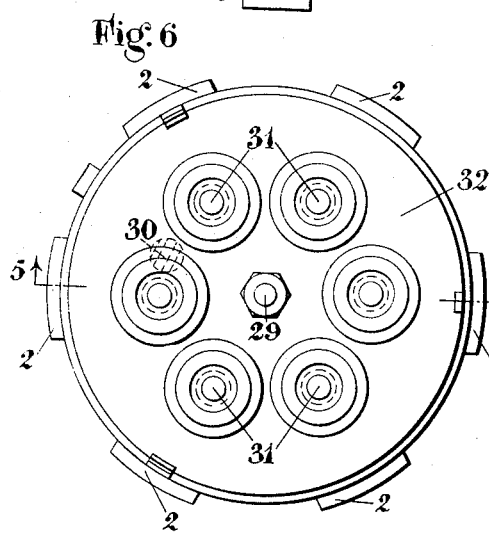
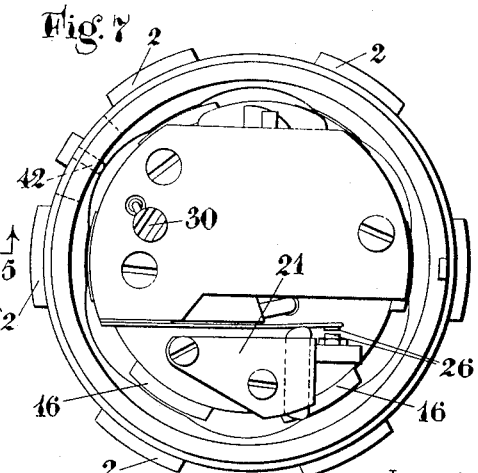
Inventor
Frederic Strickland
By Alexander Powell  Atty Patented Dec. 5, 1933

1,938,262

UNITED STATES PATENT OFFICE 1,938,262

HIGH-TENSION MAGNETO-ELECTRIC MACHINE

Frederic Strickland, Boynton, Bridlington, England

Application December 29, 1932, Serial No. 649,413, and in Great Britain January 6, 1932

12 Claims. (Cl. 171—252)

This invention is for improvements in high-tension multipolar magneto-electric machines working on the induction principle and of the type which comprises a field magnet having an even number of four or more pole pieces spaced around an armature around which a low tension winding and a high tension winding are wound so as to encircle the axis of the armature and in which current is induced in the windings by relative rotation between the armature and the field magnets so that the flux from all the pole pieces of the field magnet is reversed as many times per revolution of the armature as the number of the said pole pieces.

The invention has for its principal object to provide a high tension magneto of the above type which is completely self-contained, and of a generally improved construction as regards compactness, comparatively small dimensions and weight and a minimum number of rubbing brush contacts.

According to this invention there is provided a high-tension magneto-electric machine of the type referred to, which comprises an armature unit which embodies the low and high tension windings, a contact breaker connected in the circuit of the low tension winding, a condenser connected in shunt with the contact breaker and a high-tension distributor brush electrically connected directly with the high tension winding.

In order that the invention may be fully understood, reference is directed to the accompanying drawings, in which:—

Figure 1 is a longitudinal section of a high-tension magneto constructed in accordance with the invention, for producing six sparks per revolution of the armature and arranged for mounting so that the armature spindle may readily be disposed in a vertical position.

Figure 2 is a plan of half the magneto illustrated in Figure 1, the other half being a replica of that shown.

Figure 5 is a longitudinal section of a modified form of magneto constructed in accordance with the invention.

Figure 6 is a plan of Figure 5 and indicates a line 5—5 upon which the section shown in Figure 5 is taken.

Figure 7 is a plan of the magneto illustrated in Figure 5 with a cover plate removed.

Figure 8 is a section on the line 8—8 of Figure 1.

Figure 9 is a diagrammatic perspective view of the inductor element of the rotating armature employed in the magneto illustrated in Figures 5 to 8.

Figure 3:
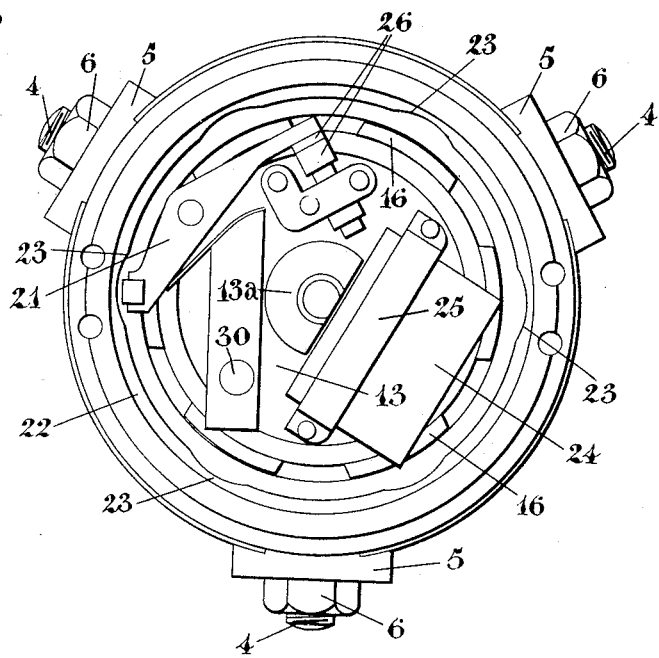
Figure 3 is a plan of the magneto illustrated in Figure 1 with the upper cover plates and a bearing removed.

Referring to Figures 1 to 4, the magneto comprises a body portion 1 having an annular wall 1a in which slots are formed to accommodate a series of six pole pieces 2, which may be laminated. The pole pieces have their inner faces disposed at regular intervals around the wall 1a of the body portion and a series of three curved permanent magnets 3 are clamped to the wall 1a by means of studs 4, secured to the said wall and extending through straps 5 of non-ferrous material each of which is maintained in engagement with adjacent ends of two of the magnets 3 by means of nuts 6. The north and south poles of each of the magnets 3 are located adjacent to the straps 5 so that the pole pieces 2 are of alternate polarity around the circumference of the machine and are indicated at N and S in Figures 1 and 4. Each of the pole pieces 2 is thus of either north or south polarity for the whole of the length thereof and extends substantially the length of the machine.

A bearing 7 is provided in the lower end of the body portion 1 and is arranged to support a rotatable spindle 8, the upper end of which is provided with a flange 8a.

Upon the flange 8a an armature assembly is mounted which comprises a core 12 of ferro-magnetic material, upon the ends of which a pair of members 14 of ferro-magnetic material are provided which are sunk into the inner faces of end plates 13 of non-ferrous material; the members 14 may be soldered to the plates 13 or the plates may be cast in situ upon the said members. Each member 14 is provided with three radially disposed arms 15, to the outer end of each of which a pole piece in the form of a shoe 16 of ferro-magnetic material is secured by means of a screw 17. The arms 15 and shoes 16 at one end of the armature are spaced around the axis of the spindle 8 by angles of 60° with respect to the arms and shoes of the member 14 located at the other end of the armature. The shoes 16 extend for the length of the armature and are equal in length to the pole pieces 2, being aligned therewith in the axial direction of the spindle 8. The magnetic circuit of the armature comprises the core 12, members 14 and shoes 16 which are preferably laminated as shown in the drawings. The arms 15 may be made in one piece with the shoes 16 or with the armature core 12 or may be separate from either as desired, for constructional reasons. The free end of each of the shoes 16 is secured to the adjacent end plate 13 by a screw 18. Primary and secondary windings 19 and 20 are mounted between the end plates 13 and members 14 upon the core 12, the windings being co-axially arranged with respect to the spindle 8.

It is to be understood that each of the shoes 16 is of a width circumferentially of the armature sufficient to bridge the space between any adjacent pair of pole pieces 2.

The upper end plate 13 is provided with an extension 13a in the form of a spindle co-axially arranged with respect to the spindle 8 and carried in a bearing 9 mounted in a bridge member 10. The extremities of the bridge member are downwardly extended and engage with the upper edge of the wall 1a to which the bridge is secured by screws 11.

Upon the upper end plate 13, a contact breaker 21 for interrupting the circuit of the primary winding 19 is mounted and is arranged to be actuated as the armature rotates by means of a cam ring 22 secured within the upper end of the wall 1a of the body portion of the machine, a series of six cams 23 being formed in the ring at equal angular distances around the axis of the spindle 8 so as to ensure six actuations of the contact breaker for each revolution of the said spindle. The construction and operation of the contact breaker 21 is similar to the well known magneto practice and needs no further description. A condenser 24 is also mounted upon the upper end plate 13 by means of a strip 25 and is connected in the usual way across the contacts 26 of the contact breaker 21.

A brush 27 is located within an axial recess formed in the upper end of the extension 13a of the upper end plate 13, the brush being insulated from the extension by a bush 28 of insulating material. The brush 27 is spring pressed against a terminal 29 carried by and insulated from the bridge member 10 and the brush is electrically connected to the primary winding 19 so that the primary winding may be earthed via the terminal 29 so as to short-circuit the contacts 26 and render the magneto inoperative in the usual way for the purpose of stopping the engine.

The high tension end of the secondary winding 20 is connected directly to a distributor 30, Figure 3, mounted upon and insulated from the upper end plate 13 and of substantially the same radial distance from the axis of the spindle 8 as the radial distance of a series of six high tension terminals 31 spaced at angles of 60° from one another about the axis of the said spindle and three of which are provided upon each of the halves 32 of a cover plate formed of insulating material which is mounted upon the upper end of the wall 1a of the body of the machine beneath the bridge 10. It will be appreciated that the terminal 30 and the terminals 31 constitute the distributor of the magneto, the high tension current passing from the terminal 30 to the terminals 31 by the well known "spark-gap" method. A rubbing brush distributor may, of course, be used if preferred.

The lower end of the spindle 8 is arranged to extend through a sleeve 33 provided with a bearing 34 and a collar 35 having driving dogs 36 is secured to the lower end of the spindle 8. The magneto is arranged to be mounted wihin a support having a recess arranged to receive the sleeve 33, the spindle 8 being coupled to the driving spindle therefor of an internal combustion engine by means of the dogs 36. Other forms of mounting and driving dogs may, of course, be employed.

The magneto illustrated in Figures 5 to 9 is substantially similar to that illustrated in Figures 1 to 4 above described and similar reference numerals have been employed to indicate similar parts of the machine. In this modified construction, however, the permanent magnet system is formed by a one-piece magnet, preferably of cobalt steel, of which the pole pieces 2 of alternate polarity are connected together at the lower end by an annular end portion 37 through which a bush extension 38 of the body portion 1 of the machine is arranged to extend. The magnet is secured to the body portion 1 by means of a nut 39 arranged to screw on to the bush 38 whilst an extension of the bush 38 forms the sleeve 33 hereinbefore referred to.

In this construction, the upper bearing illustrated in Figure 1 is dispensed with and the spindle 8, reduced in diameter, is arranged to extend through a hole formed in the core 12 of the armature which may be secured to the spindle by means of a nut. The cover plate 32 carrying the high tension terminals 31 is formed in one piece and is provided with a downwardly directed flange 40 arranged to extend within the upper portion of the cam ring 22 which is secured within the upper end of the annular wall 1a of the body of the machine.

The diagrammatic perspective view of the inductor element of the armature illustrated in Figure 9 serves to show the general arrangement of this structure and in general form is the same for both constructions illustrated in the drawings.

The operation of the magnetos described is as follows:—

Figure 4:
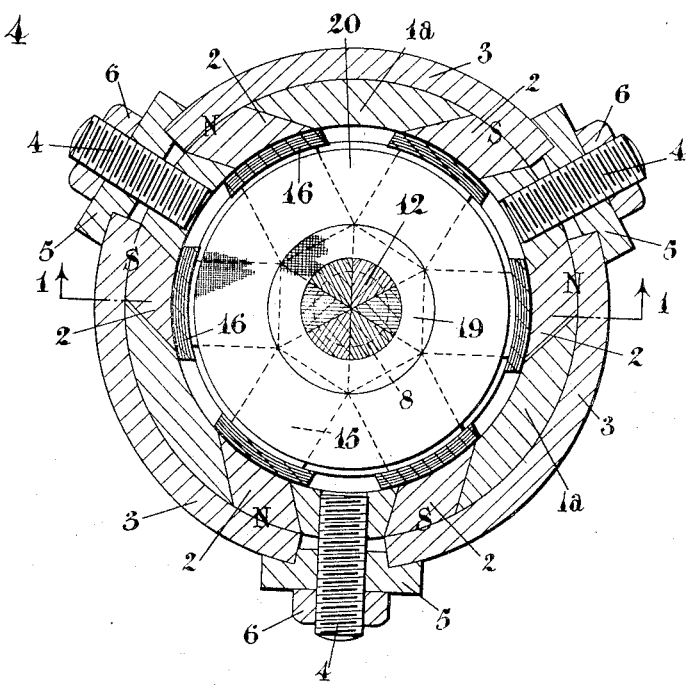
Figure 4 is a section on a line corresponding to the line 4—4 of Figure 1 and indicating a line 1—1 upon which the section shown in Figure 1 is taken.

During the rotation of the spindle 8 the shoes 16 of the inductor alternately assume a position such as that illustrated in Figures 4 and 8, and a position in which they bridge adjacent pole pieces 2. When the shoes bridge adjacent pole pieces the magnetic flux flows from the pole pieces directly through the shoes in the form of a closed ring around the exterior of the windings 19, 20. As soon, however, as the shoes are moved so that they no longer bridge adjacent pole pieces, the flux flows from the pole pieces through the shoes and through the magnetic circuit formed by the arms 15 and armature core 12 of the inductor. Thus, the magnetic flux is caused to pass to and fro through the windings 19 and 20 with six complete reversals per revolution of the spindle 8. The operation of the contact breaker 21 is arranged to coincide as closely as possible with the alternations of the flux so as to produce a spark of the greatest possible intensity and in order that the necessary adjustment of the contact breaker may be made, the cam ring 22 may be arranged to be adjustable relatively to the body of the magneto and to this end may be secured thereto by a screw and slot connection such as that illustrated at 42 in Figure 7.

While both arrangements shown are for a magneto making six sparks per revolution, it is understood that the machine may be made for any even number of four or more sparks per revolution and, therefore, suitable for any corresponding number of cylinders without additional complication, it being necessary only to provide a number of magnet pole pieces equal to the number of sparks per revolution desired, the arms at the ends of the induction element of the armature and the shoes being also increased and the contact breaker ring and distributor modified accordingly.

From the foregoing description of the two embodiments of the invention, it will be appreciated that a high tension magneto is provided having an armature unit which embodies the high and low tension windings 19, 20, the contact breaker 21 which is shunted by the condenser 24 and the high tension distributor brush 30 directly connected to the high tension winding 20. Thus, when the "spark-gap" method of high tension distributor is employed as illustrated in the drawings, all rubbing contact brushes are eliminated so far as the normal running of the magneto is concerned, because the brush 27 is only for short-circuiting the contact breaker when it is required to render the magneto inoperative.

It will be appreciated that with the pole pieces 2 extending axially of the armature for the whole length thereof, they are enabled to co-operate with the inductor so that the magnetic flux from all the pole pieces is brought into effective operation at each reversal through the windings 19, 20 and thus ensures a maximum efficiency. In addition the relatively large area of the shoes of the inductor ensures minimum losses due to leakage of magnetic flux when passing from the pole pieces to the said shoes. This feature is made possible by mounting the windings so as to rotate with the spindle of the machine, thus enabling the shoes to extend over the windings which is not possible in machines in which a winding located around the spindle is stationarily mounted relatively thereto.

Moreover, the windings being arranged coaxially with the spindle of the machine in a manner known per se, are in a position in which the stresses produced in the windings due to centrifugal force, are resisted with the greatest advantage, as opposed to the shuttle type of winding in which centrifugal forces operate disadvantageously upon the axially disposed parts of the windings and frequently cause fractures in the winding.

It will be appreciated that the invention comprises magnetos constructed substantially in the manner described which are provided with any even plurality of four or more pole pieces dependent upon the number of sparks which are to be produced per revolution of the armature. This construction, in the case of multi-cylinder four-stroke cycle engines, enables the magneto to run at cam shaft speed, also in a manner known per se, no matter how many cylinders the engine may have, which is a distinct advantage over other known forms of magneto in which it is necessary to increase the relative speed of the magneto proportionately with the increase in the number of cylinders provided upon the engine and in which it is also necessary to provide a geared-down distributor for the high tension current, a feature which is eliminated in the present invention.

Further, magnetos constructed in accordance with the invention are extremely compact and the constructions described are adapted for vertical mounting in a known manner similarly to the distributors usually employed in conjunction with coil ignition systems and provide the advantage that the advance and retard of the ignition may be obtained by a simple rotation of the body of the magnetos in the support for the sleeve 33, thus ensuring that unlimited advance and retard movements may be obtained whilst in no way affecting the intensity of the spark produced, as is the case with the ordinary type of magneto, in view of the fact that the magnetic system of the magneto is rotated in unison with the cam ring.

It has been found that the self-contained magnetos according to this invention may be constructed of dimensions and weight which are a considerable reduction over magnetos of a similar character as heretofore constructed.

What I claim and desire to secure by Letters Patent of the United States is:—

1. A high-tension multi-polar magneto-electric machine of the inductor type which comprises in combination a permanent field magnet of at least four pole pieces of alternately opposite polarity spaced circumferentially around and extending lengthwise of a central axis of the magneto, an annular slotted body member of dia-magnetic material carrying said pole pieces within said slots and a self-contained armature unit mounted within said body member and rotatable relatively to said body and field magnet about said axis and which comprises a central para-magnetic core provided with a plurality of pole shoes operable during each rotation of the armature relatively to the field magnet to reverse the magnetic flux from all the field pole pieces through said core as many times as the number of the field pole pieces, low and high tension windings around said core, a contact breaker connected in the circuit of the low tension winding, a condenser connected in shunt with said contact breaker and a high tension distributor electrode electrically connected directly with said high tension winding.

2. A high-tension multi-polar magneto-electric machine of the inductor type which comprises in combination a permanent field magnet of at least four pole pieces of alternately opposite polarity spaced circumferentially around and extending lengthwise of a central axis of the magneto, an annular slotted body member of dia-magnetic material carrying said pole pieces within said slots and a self-contained armature unit mounted within said body member and rotatable relatively to said body and field magnet about said axis and which comprises a central para-magnetic core provided with a plurality of pole shoes operable during each rotation of the armature relatively to the field magnet to reverse the magnetic flux from all the field pole pieces through said core as many times as the number of the field pole pieces, low and high tension windings around said core, a contact breaker connected in the circuit of the low tension winding, a condenser connected in shunt with said contact breaker and a high tension distributor electrode electrically connected directly with said high tension winding, said contact breaker, condenser and distributor electrode all being mounted at one and the same end of said armature.

3. A high-tension multi-polar magneto-electric machine of the inductor type which comprises in combination an annular dia-magnetic body portion having at least four axially disposed slots extending through the wall thereof and equally spaced around the same, a pole piece carried in each of said slots, a plurality of arcuate permanent field magnets secured around said body so that alternate pole pieces are of opposite polarity and a self-contained armature unit mounted within said body member and rotatable relatively to said body and field magnet about said axis and which comprises a central para-magnetic core provided with a plurality of pole shoes operable during each rotation of the armature relatively to the field magnet to reverse the magnetic flux from all the field pole pieces through said core as many times as the number of the field pole pieces, low and high tension windings around said core, a contact breaker connected in the circuit of the low tension winding, a condenser connected in shunt with said contact breaker and a high tension distributor electrode electrically connected directly with said high tension winding.

4. A high-tension multi-polar magneto-electric machine of the inductor type which comprises in combination an annular dia-magnetic body portion having at least four axially disposed slots extending through the wall thereof and equally spaced around the same, a permanent field magnet comprising a plurality of parallel polar limbs of opposite polarity equal in number to said slots and extending from one side of a base member, one of said limbs being located in each of said slots, and a self-contained armature unit mounted within said body member and rotatable relatively to said body and field magnet about said axis and which comprises a central para-magnetic core provided with a plurality of pole shoes operable during each rotation of the armature relatively to the field magnet to reverse the magnetic flux from all the field pole pieces through said core as many times as the number of the field pole pieces, low and high tension windings around said core, a contact breaker connected in the circuit of the low tension winding, a condenser connected in shunt with said contact breaker and a high tension distributor electrode electrically connected directly with said high tension winding.

5. A high-tension multi-polar magneto-electric machine of the inductor type which comprises in combination an annular dia-magnetic body portion having at least four axially disposed slots extending through the wall thereof and equally spaced around the same, a permanent field magnet comprising a plurality of parallel polar limbs of opposite polarity equal in number to said slots and extending from one side of a base member, one of said limbs being located in each of said slots, and a self-contained armature unit mounted within said body member and rotatable relatively to said body and field magnet about said axis and which comprises a central para-magnetic core provided with a plurality of pole shoes operable during each rotation of the armature relatively to the field magnet to reverse the magnetic flux from all the field pole pieces through said core as many times as the number of field pole pieces, low and high tension windings around said core, a contact breaker connected in the circuit of the low tension winding, a condenser connected in shunt with said contact breaker and a high tension distributor electrode electrically connected directly with said high tension winding, said contact breaker, condenser and distributor electrode all being mounted at one and the same end of said armature.

6. A high-tension multi-polar magneto-electric machine of the inductor type which comprises in combination an annular dia-magnetic body portion having at least four axially disposed slots extending through the wall thereof and equally spaced around the same, a permanent field magnet comprising a plurality of parallel polar limbs of opposite polarity equal in number to said slots and extending from one side of a base member, one of said limbs being located in each of said slots, and a self-contained armature unit mounted within said body member and rotatable relatively to said body and field magnet about said axis and which comprises a central para-magnetic core provided with a plurality of pole shoes operable during each rotation of the armature relatively to the field magnet to reverse the magnetic flux from all the field pole pieces through said core as many times as the number of the field pole pieces, low and high tension windings around said core, a contact breaker connected in the circuit of the low tension winding, a condenser connected in shunt with said contact breaker and a high tension distributor electrode electrically connected directly with said high tension winding, said contact breaker, condenser and distributor all being located at one and the same end of the armature opposite to the base member of the said field magnet.

7. A high tension multi-polar magneto-electric machine of the inductor type which comprises in combination an annular dia-magnetic body portion having an axially disposed sleeve extension at one end and formed with at least four axially disposed slots in the wall thereof, said slots being equally spaced around said body, a permanent field magnet comprising a plurality of parallel polar limbs of opposite polarity equal in number to said slots and extending from one side of an annular base member arranged around said sleeve so that one of said limbs is located in each of said slots, and a self-contained armature unit comprising a para-magnetic core carried by a spindle provided at one end of the armature and rotatably mounted in said sleeve, a plurality of pole shoes on said core operable during each rotation of the armature to reverse the magnetic flux from all the field pole pieces through said core as many times as the number of field pole pieces, low and high tension windings around said core, a contact breaker connected in the circuit of the low tension winding, a condenser connected in shunt with said contact breaker and a high tension distributor electrode electrically connected directly with said high tension winding, the said contact breaker, condenser and distributor all being mounted at the opposite end of the armature to said spindle.

8. A high-tension multi-polar magneto-electric machine of the inductor type which comprises in combination an annular dia-magnetic body portion having an axially disposed sleeve extension at one end and formed with at least four axially disposed slots in the wall thereof, said slots being equally spaced around said body, a plurality of permanently magnetized field pole pieces of alternately opposite polarity located in each of said slots, and a self-contained armature unit comprising a para-magnetic core carried by a spindle provided at one end of the armature and rotatably mounted in said sleeve, a plurality of pole shoes on said core operable during each rotation of the armature to reverse the magnetic flux from all the field pole pieces through said core as many times as the number of field pole pieces, low and high tension windings around said core, a contact breaker connected in the circuit of the low tension winding, a condenser connected in shunt with said contact breaker and a high tension distributor electrode electrically connected directly with said high tension winding, the said contact breaker, condenser and distributor all being mounted at the opposite end of the armature to said spindle.

9. A high-tension multi-polar magneto-electric machine of the inductor type which comprises in combination an annular dia-magnetic body portion having an axially disposed sleeve extension at one end and formed with at least four axially disposed slots in the wall thereof, said slots being equally spaced around said body, a plurality of permanently magnetized field pole pieces of alternately opposite polarity one located in each of said slots, and a self-contained armature unit comprising a para-magnetic core carried by a spindle provided at one end of the armature and rotatably mounted in said sleeve, a plurality of pole shoes on said core operable during each rotation of the armature to reverse the magnetic flux from all the field pole pieces through said core as many times as the number of field pole pieces, low and high tension windings around said core, a contact breaker connected in the circuit of the low tension winding, a condenser connected in shunt with said contact breaker and a high tension distributor electrode electrically connected directly with said high tension winding, the said contact breaker, condenser and distributor all being mounted on the opposite end of the armature to said spindle, and a cam ring for actuating said contact breaker mounted upon said body portion and adjustable around the axis thereof.

10. A high-tension multi-polar magneto-electric machine of the inductor type which comprises in combination an annular dia-magnetic body portion having at least four axially disposed slots extending through the wall thereof, and equally spaced around the same, a pole piece carried in each of said slots, a plurality of arcuate permanent field magnets secured around said body so that alternate pole pieces are of opposite polarity and a self-contained armature unit mounted within said body member and rotatable relatively to said body and field magnet about said axis and which comprises a central para-magnetic core provided with a plurality of pole shoes extending parallel to the axis of the armature and spaced from said core, alternate shoes being carried by opposite ends of the core and adapted during each rotation of the armature relatively to the field magnet to reverse the magnetic flux from all the field pole pieces through said core as many times as the number of field pole pieces, low and high tension windings around said core, a contact breaker connected in the circuit of the low tension winding, a condenser connected in shunt with said contact breaker and a high tension distributor electrode electrically connected directly with said high tension winding.

11. A high-tension multi-polar magneto-electric machine of the inductor type which comprises in combination an annular dia-magnetic body portion having at least four axially disposed slots extending through the wall thereof, and equally spaced around the same, a permanent field magnet comprising a plurality of parallel polar limbs of opposite polarity equal in number to said slots and extending from one side of a base member, one of said limbs being located in each of said slots, and a self-contained armature unit mounted within said body member and rotatable relatively to said body and field magnet about said axis and which comprises a central para-magnetic core provided with a plurality of pole shoes extending parallel to the axis of the armature and spaced from said core, alternate shoes being carried by opposite ends of the core and adapted during each rotation of the armature relatively to the field magnet to reverse the magnetic flux from all the field pole pieces through said core as many times as the number of field pole pieces, low and high tension windings around said core and located within the confines of said pole shoes, a contact breaker connected in the circuit of the low tension winding, a condenser connected in shunt with said contact breaker and a high tension distributor electrode electrically connected directly with said high tension winding, said contact breaker, condenser and distributor electrode, all being mounted at one and the same end of said armature.

12. A high-tension multi-polar magneto-electric machine of the inductor type which comprises in combination an annular dia-magnetic body portion having an axially disposed sleeve extension at one end and formed with at least four axially disposed slots in the wall thereof, said slots being equally spaced around said body, a plurality of permanently magnetized field pole pieces of alternately opposite polarity located in each of said slots, and a self-contained armature unit comprising a para-magnetic core carried by a spindle provided at one end of the armature and rotatably mounted in said sleeve, a plurality of pole shoes extending parallel to the axis of the armature and spaced from said core, alternate shoes being carried by opposite ends of the core and adapted during each rotation of the armature to reverse the magnetic flux from all the field pole pieces, low and high tension windings around said core and located within the confines of said pole shoes, a contact breaker connected in the circuit of the low tension winding, a condenser connected in shunt with said contact breaker and a high tension distributor electrode electrically connected to said high tension winding, the said contact breaker, condenser and distributor all being mounted at the opposite end of the armature to said spindle.

FREDERIC STRICKLAND.